(12) United States Patent
Townsend et al.

(10) Patent No.: US 10,177,684 B2
(45) Date of Patent: Jan. 8, 2019

(54) CONVERTER FOR AN AC SYSTEM

(71) Applicant: ABB Schweiz AG, Baden (CH)

(72) Inventors: Christopher Townsend, Newcastle (AU); Hector Zelaya de la Parra, Västerås (SE)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 15/119,477

(22) PCT Filed: Feb. 18, 2014

(86) PCT No.: PCT/EP2014/053069
§ 371 (c)(1),
(2) Date: Aug. 17, 2016

(87) PCT Pub. No.: WO2015/124165
PCT Pub. Date: Aug. 27, 2015

(65) Prior Publication Data
US 2017/0250621 A1   Aug. 31, 2017

(51) Int. Cl.
*H02M 7/487* (2007.01)
*H02M 7/49* (2007.01)
(Continued)

(52) U.S. Cl.
CPC ........... *H02M 7/487* (2013.01); *H02M 1/084* (2013.01); *H02M 7/49* (2013.01); *H02M 7/493* (2013.01);
(Continued)

(58) Field of Classification Search
CPC ............ H02M 7/00; H02M 7/02; H02M 7/04; H02M 7/08; H02M 7/068; H02M 7/12;
(Continued)

(56) References Cited

U.S. PATENT DOCUMENTS

| | | | |
|---|---|---|---|
| 5,193,054 | A | 3/1993 | Galloway et al. |
| 5,337,227 | A | 8/1994 | Stacey et al. |

(Continued)

FOREIGN PATENT DOCUMENTS

| | | |
|---|---|---|
| EP | 2 383 877 A1 | 11/2011 |
| EP | 2 536 018 A1 | 12/2012 |

(Continued)

OTHER PUBLICATIONS

Chivite-Zabalza et al., "A Large Power, Low-Switching-Frequency Voltage Source Converter for Facts Applications With Low Effects on the Transmission Line", IEEE Transactions on Power Electronics, Dec. 2012, vol. 27, No. 12, pp. 4868-4879, Figure 1, Abstract and p. 4870.

(Continued)

*Primary Examiner* — Gustavo Rosario Benitez
*Assistant Examiner* — Carlos Rivera-Perez
(74) *Attorney, Agent, or Firm* — Birch, Stewart, Kolasch & Birch, LLP

(57) ABSTRACT

A converter arrangement for an AC system includes a phase leg including a first sub-converter, a second sub-converter, an IPT interface configured for connecting the first and second sub-converters with a phase line A, and at least one DC bus connected to the first and second sub-converters. The first sub-converter is connected in parallel with the second sub-converter between the DC bus and the IPT interface. Each of the first and second sub-converters includes a chain-link converter connected to the IPT interface and including a plurality of converter cells connected in series with each other, and a common DC link multilevel converter connected to the DC bus and in series with the chain-link converter.

20 Claims, 4 Drawing Sheets

(51) Int. Cl.
*H02M 7/493* (2007.01)
*H02M 1/084* (2006.01)
*H02M 7/537* (2006.01)
*H02M 7/483* (2007.01)

(52) U.S. Cl.
CPC .... *H02M 7/537* (2013.01); *H02M 2007/4835* (2013.01)

(58) Field of Classification Search
CPC ...... H02M 7/125; H02M 7/21; H02M 7/2173; H02M 7/2176; H02M 7/219; H02M 7/2195; H02M 7/44; H02M 7/48; H02M 7/4807; H02M 7/4822; H02M 7/4826; H02M 7/483; H02M 7/487; H02M 7/49; H02M 7/493; H02M 7/42; H02M 7/537; H02M 7/501; H02M 7/53; H02M 7/5387; H02M 7/53871; H02M 7/5388; H02M 7/539; H02M 7/5397; H02M 1/12; H02M 1/08; H02M 1/083; H02M 1/084; H02M 1/0845; H02M 2007/4835; H02M 2007/53878; H02M 2001/0067; H02M 2001/007; H02M 2001/0077; H02M 2001/008; H02M 2001/12; H02M 2001/123
USPC .... 363/15–21.03, 34, 35, 37, 40–48, 64, 65, 363/67–72, 95–99, 123–127, 131–134; 323/205–211, 222–226, 235, 271–275, 323/282–285, 351
See application file for complete search history.

(56) References Cited

U.S. PATENT DOCUMENTS

| | | | |
|---|---|---|---|
| 5,434,771 | A | 7/1995 | Danby et al. |
| 6,510,063 | B2* | 1/2003 | Kobayashi ............... H02M 1/12 363/137 |
| 2011/0273916 | A1* | 11/2011 | Fujiwara ............... H02M 7/487 363/71 |

FOREIGN PATENT DOCUMENTS

| | | |
|---|---|---|
| JP | 6-78548 A | 3/1994 |
| JP | 6-217552 A | 8/1994 |
| JP | 2001-127562 A | 5/2001 |
| WO | WO 97/39519 A1 | 10/1997 |

OTHER PUBLICATIONS

Noguchi et al., "New topologies of multi-level power converters for use of next-generation ultra high-speed switching devices", Energy Conversion Congress and Exposition, IEEE, Sep. 20, 2009, pp. 1968-1975, Figure 5 and pp. 1969-1970.

Ruiz-Caballero et al., "Symmetrical Hybrid Multilevel Inverter Concept Based on Multi-State Switching Cells", IEEE, 2011, pp. 776-781.

Young et al., "A Novel Active Interphase Transformer Scheme to Achieve Three-Phase Line Current Balance for 24-Pulse Converter", IEEE Transactions on Power Electronics, Apr. 2012, vol. 27, No. 4, pp. 1719-1731.

* cited by examiner

CONVERTER FOR AN AC SYSTEM

TECHNICAL FIELD

The present disclosure relates to a converter arrangement for an AC system. The converter arrangement comprises a common DC bus and an inter-phase transformer (IPT) interface for connection to an AC phase line.

BACKGROUND

Multilevel converters are found in many high power applications in which medium to high voltage levels are present in the system. By virtue of their design, multilevel converters share the system voltage (line-to-line or phase voltages) eliminating the need of series connection of devices. These converters may be connected in Delta or Wye in a variety of well-known topologies. These topologies (and variants thereof) can be used for high-voltage direct current (HVDC) and flexible alternating current transmission system (FACTS) applications.

Modular multilevel converters (also called chain-link converters) are often used because of their high efficiencies, their modularity and scalability, as well as for their ability to produce voltage waveforms with low harmonic content which effectively reduce the need for large alternating current (AC) filters. Several modular multilevel converter topologies exist, e.g. M2LC (also called MMLC and MMC), in particular in flexible alternating current transmission system (FACTS) applications, high voltage direct current (HVDC) applications but also in motor drives etc.

Two of the main parameters in the selection among the various alternatives of converters are the cost and the losses. Both parameters are related to the total silicon area used in the converter which is affected by the voltage and current ratings. In addition to steady-state balanced operation of the converter, the designer must take into account the unbalance in the three-phase system. This unbalance results in negative sequence currents and voltages that need to be compensated by the converter. The net effect is that the current rating of the valves (or the total number of cells) will increase due to the zero sequence current or voltage that needs to be injected to compensate for the unbalanced condition. The consequence of this higher number of cells is a higher cost and higher losses.

The problems of higher cost and higher losses associated with negative sequence conditions can be mitigated by including degrees of parallelization into multi-level converter configurations for FACTS applications. Parallel connected sub-converters provide common storage elements which facilitate energy exchange between phases in the converter. This reduces the total stored energy in the converter and avoids overrating due to zero sequence to voltage or current.

The Institute of Electrical and Electronics Engineers (IEEE) article "A large power, low-switching frequency Voltage Source Converter for FACTS applications" by Javier Chivite-Zabalza et al. discloses a converter with parallel 3-level (3-L) neutral point clamped (NPC) inverters. The converter combines four three-phase 3-L NPC inverters that share a common direct current (DC) bus. The twelve resulting converter poles are combined in parallel pairs by means of inter-phase transformers (IPTs, also sometimes called inter-cell transformers, ICT) to obtain two sets of three-phase systems. A problem with this topology is that an intermediate transformer is needed to obtain the required voltage and the intermediate transformer adds significant cost to the converter arrangement, particularly in industrial applications where connection voltages are typically low enough to avoid transformer connection. Another disadvantage with the topology is that it requires a series connection of cascaded intermediate transformers to further increase the output voltage.

SUMMARY

It is an objective of the present invention to provide an improved converter topology at a reduced cost.

According to an aspect of the present invention, there is provided a converter arrangement for an AC system. The converter arrangement comprises at least one phase leg comprising a first sub-converter (2a), a second sub-converter, an IPT interface configured for connecting the first and second sub-converters with a phase line of the AC system, and at least one DC bus connected to the first and second sub-converters. The first sub-converter is connected in parallel with the second sub-converter between the at least one DC bus and the IPT interface. Each of the first and second sub-converters comprises a chain-link converter connected to the IPT interface and comprising a plurality of converter cells connected in series with each other, and a common DC link multilevel converter connected to the at least one DC bus and in series with the chain-link converter.

By using a plurality of parallel sub-converters, each of which comprising a plurality of modular converter cells, the output voltage to the IPT can be increased, e.g. compared with using NPC inverters only, while the current through the cell switches can be kept down. Further, connecting the sub-converters via an IPT interface, allows for current sharing between phase-legs which have a common DC-link, and allows for superimposing the voltage waveform of each sub-converter and thus combining the harmonic performance of each sub-converter to achieve a higher effective switching frequency.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

In accordance with the present invention, IPTs are used while obviating the need for intermediate transformers (or reducing the number of cascaded intermediate transformers). Instead, various other multi-level converters may be used for the input of the IPTs.

Figure 1:
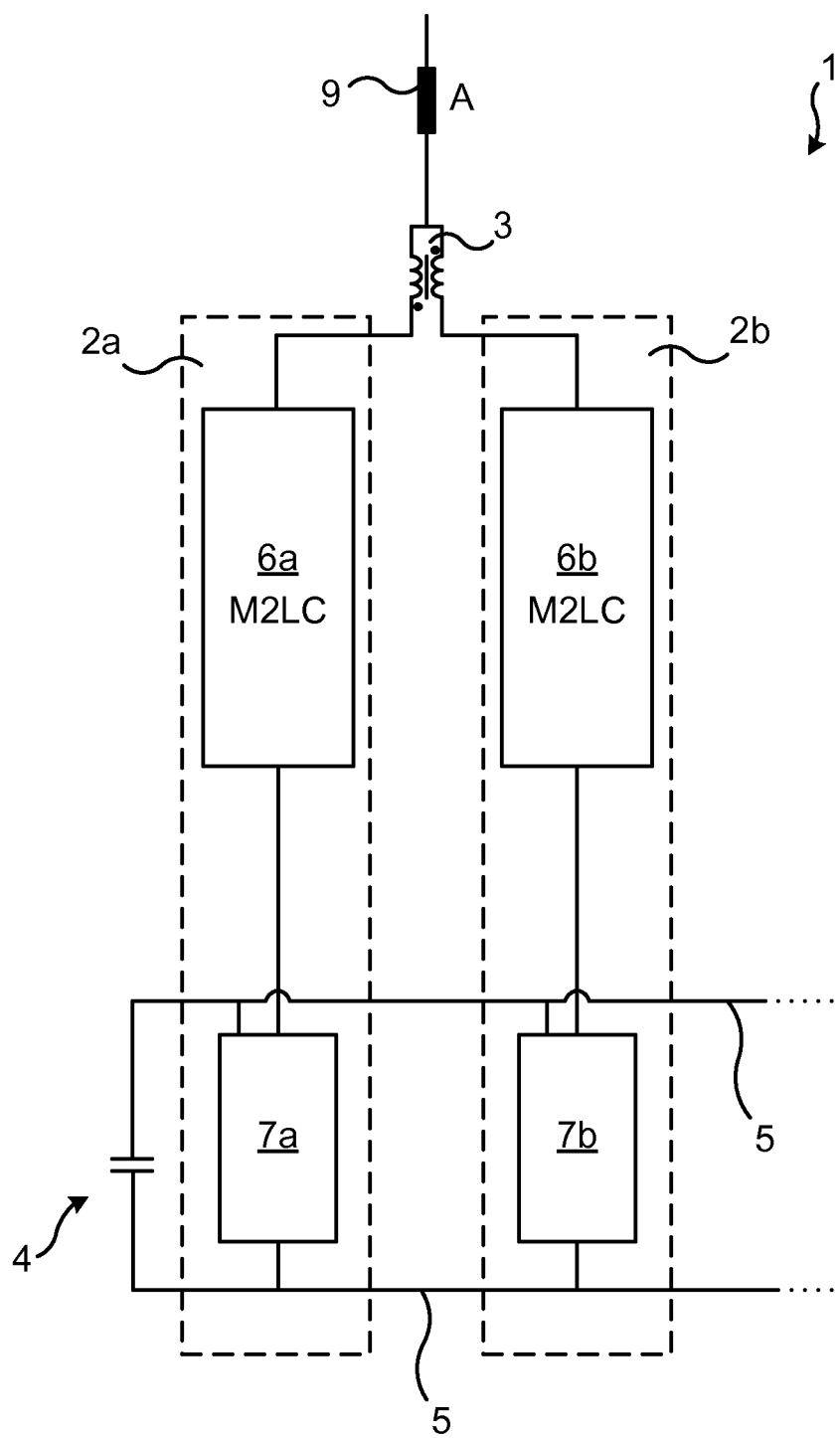
FIG. 1 is a schematic circuit diagram of phase leg of an embodiment of a converter arrangement in accordance with the present invention.

FIG. 1 is a schematic block diagram generally illustrating an embodiment of a converter arrangement 1 of the present invention. The converter arrangement 1 comprises parallel sub-converters 2. In the embodiment of FIG. 1 there are two sub-converters, a first sub-converter 2a and a second sub-converter 2b. The sub-converters 2 are connected in parallel between an IPT interface 3, in this embodiment comprising a single IPT, and a common DC bus 5. The DC bus 5 is powered by a DC source, e.g. an energy storage 4 such as comprising a capacitor, battery or supercapacitor. The common DC bus is connected to all sub-converters 2 of the converter arrangement 1. The converter arrangement 1 of FIG. 1 is only shown with a single phase leg (of the phase A), but the converter arrangement may alternatively comprise a plurality of phase legs (each comprising parallel sub-converters), e.g. three phase legs of a three-phase AC system. In that case, the common DC bus 5 continues to connect also the sub-converters of the other phases, as indicated by the dotted (unfinished) ends of the DC bus 5 in the figure. In accordance with the present invention, each sub-converter comprises a chain-link converter (chain-link) 6 connected in series with another multilevel converter 7 which is connected to the DC bus 5, herein called a common DC link multilevel converter 7 to distinguish it from the chain-link 6 and since it is connected to the DC bus 5 which may be a common DC link. The chain-link 6 is connected in series between the IPT interface 3 and the common DC link multilevel converter 7, and the common DC link multilevel converter 7 is connected in series between the DC bus 5 and the chain-link 6. Since, in the embodiment of FIG. 1, the phase leg has two sub-converters 2a and 2b, the first sub-converter 2a comprises a first chain-link 6a and a first common DC link multilevel converter 7a, while the second sub-converter 2b comprises a second chain-link 6b and a second common DC link multilevel converter 7b. The phase leg A may be connected via an inductor 9, which may be a normal inductor which is not magnetically coupled like an IPT.

Figure 2:
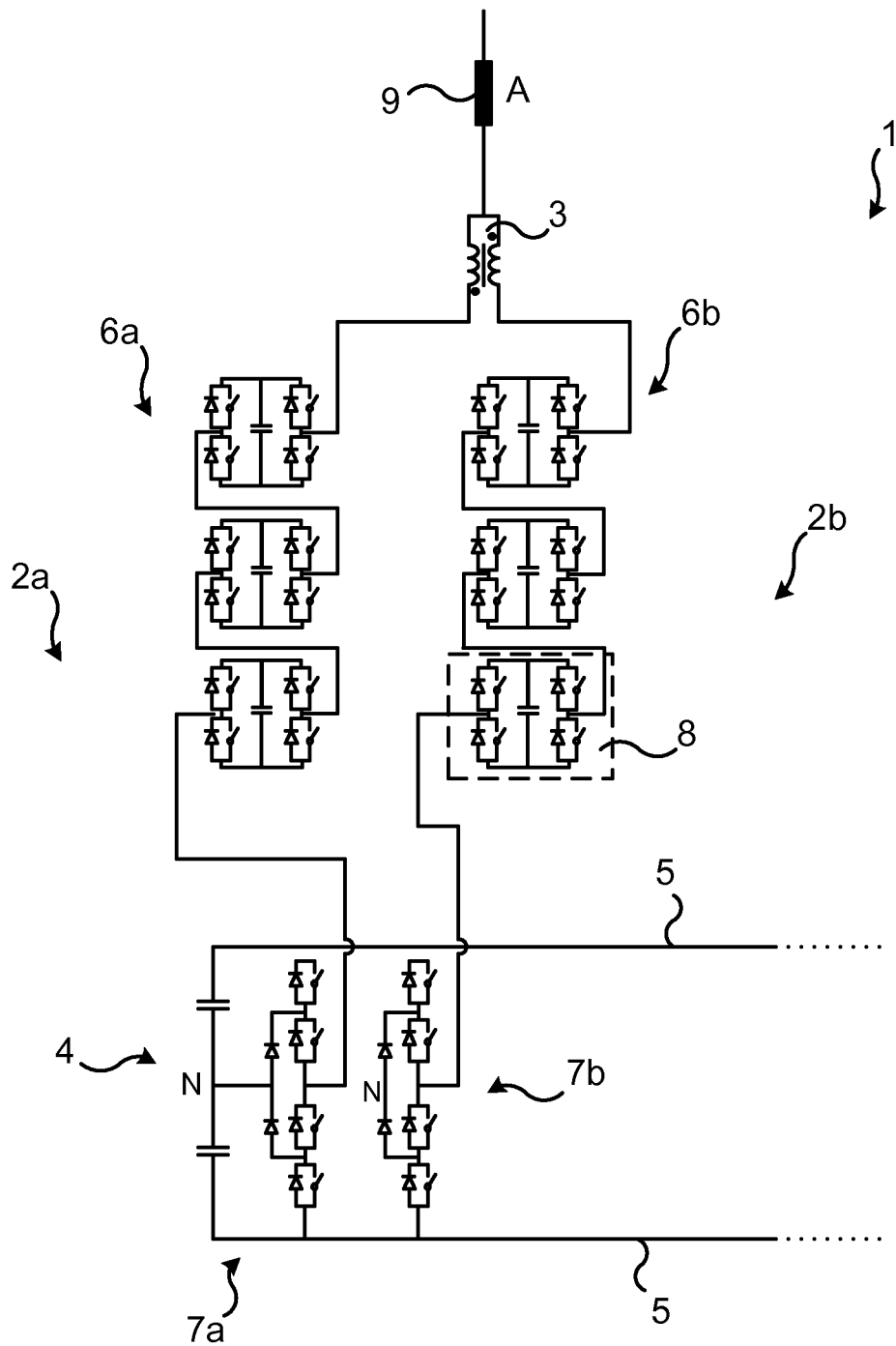
FIG. 2 is a schematic circuit diagram of phase leg of another embodiment of a converter arrangement in accordance with the present invention.

FIG. 2 schematically illustrates a phase leg of an embodiment of a converter arrangement 1 of the present invention in more detail. The set-up is generally as described in relation to FIG. 1. In the embodiment of FIG. 2, each chain-link 6 comprises a plurality of modular full-bridge (also called H-bridge) cells 8 connected in series, in this embodiment three cells 8 (of which only one is referenced in the figure) to give seven voltage levels (three positive, three negative and zero) but any number of cells 8 may be convenient for different applications. Each cell 8 comprises a capacitor and a plurality of switches, each typically with an associated diode. The switches may e.g. comprise/be insulated-gate bipolar transistors (IGBT). However, it should be noted that these are only examples of the components of the cells 8. Other corresponding components known in the art may alternatively be used. Further, the cells of the chain-link 6 may alternatively be half-bridge cells, with two switches, instead of full-bridge cells (H-bridge), with four switches. The common DC link multilevel converters 7 in the embodiment of FIG. 2 are three level NPC inverters with one NPC leg per sub-converter 2. In cooperation with the DC bus 5 and the energy storage 4, the NPC leg switches may switch between positive, negative and neutral (N) points. As an alternative, the common DC link multilevel converter 7 may be e.g. a flying-capacitor inverter instead of an NPC leg.

Figure 3:
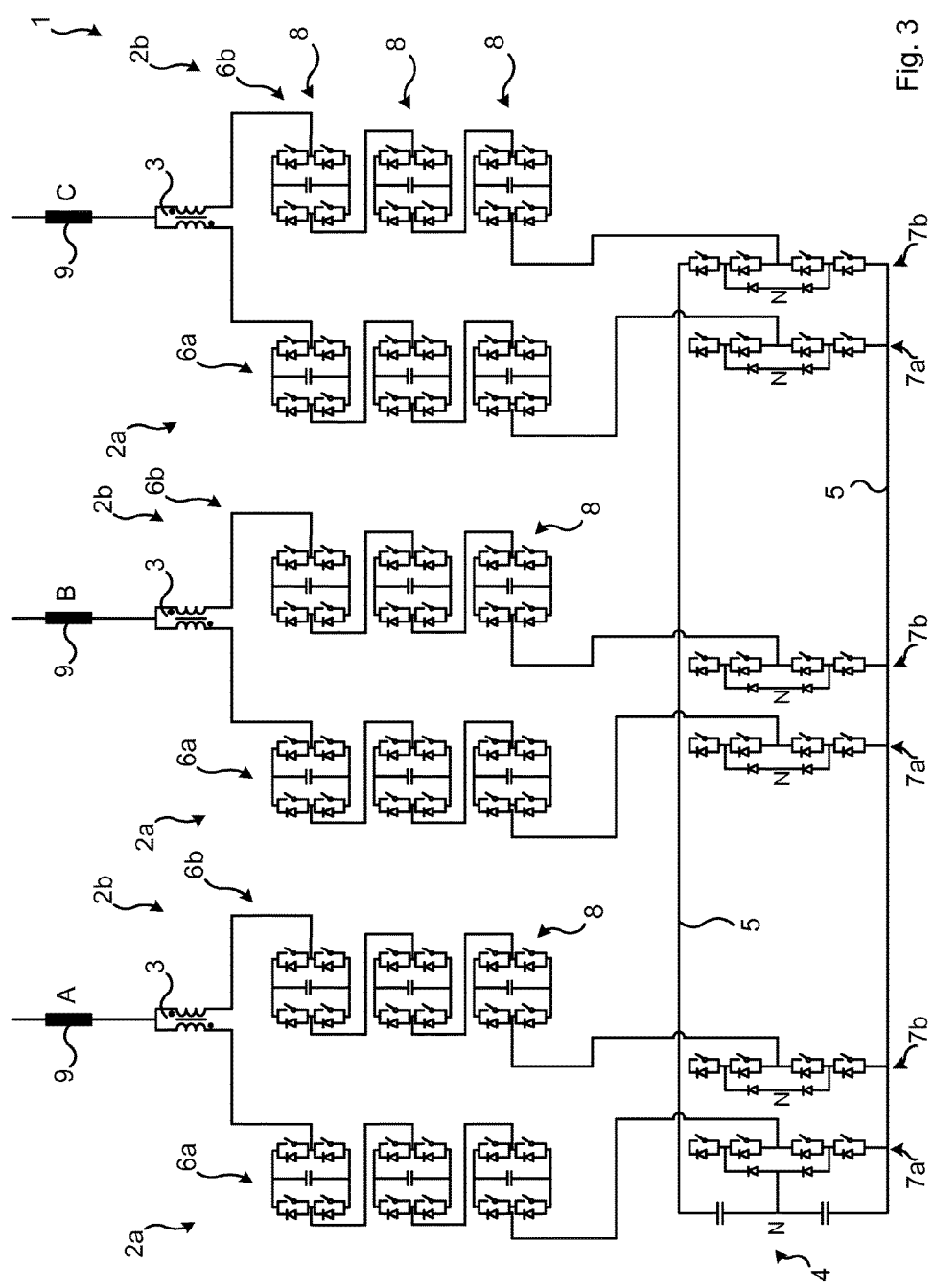
FIG. 3 is a schematic circuit diagram of a three-phase embodiment of a converter arrangement in accordance with the present invention.

FIG. 3 schematically illustrates an embodiment of a three-phase converter arrangement 1 with three phase legs (each as discussed above with reference to FIGS. 1 and 2) of the three phases A, B and C of a three-phase AC system, e.g. FACTS, connected via a respective inductor 9. In the embodiment of FIG. 3 a single common DC bus 5 is used which connects to each of the sub-converters 2 (specifically the NPC legs 7) of each phase leg. By combining the 3-L NPC 7 with the chain-link 6 in each sub-converter 2, a higher level converter topology, allowing a higher number of different voltages to be outputted, may be obtained. The topology of the present invention, e.g. in accordance with FIG. 3, may e.g. give the following advantages:

The common storage elements 4 in the converter arrangement 1 absorb or supply energy variations between the converter phase legs, which may eliminate or reduce the valve (cell 8) requirements for zero sequence voltage and/or current.

Connection of the parallel sub-converters 2 through IPT 3 provides the harmonic performance benefits that a typical series connection of sub-converters provides.

The IPTs 3 provide inherent current sharing between the sub-converters 2.

The current rating of each device (e.g. cells, especially the switches therein) is a fraction of the total converter output current. This has the following advantages:
  Lower cell capacitance is required to achieve 10% capacitor voltage ripple. This results in less stored energy per cell 8 which simplifies and reduces the cost of each individual cell.
  For a specified maximum device current, the converter arrangement 1 to may achieve a higher total output current. Including a degree of parallelization into a multi-level topology provides flexibility to choose whether higher voltage or higher current devices are utilized to construct higher power converters.
  Reduction of semiconductor losses. A net reduction in losses may be achieved due to division of current between parallel sub-converters 2.

It minimizes losses through reduction of the silicon area needed for zero sequence voltage or current.

It is possible to design the IPTs 3 with turns ratios other than 1:1, meaning that sub-converters 2 may have different current ratings and device technologies. This degree of hybridization could provide further optimization of losses and cost.

N-legged IPTs 3 (see e.g. the embodiment of FIG. 4) may be utilised to decrease the fraction of total output current that each sub-converter 2 is rated for. This could facilitate the use of early generation SiC (silicon carbide) devices that may be available at high voltages but quite low current ratings.

Figure 4:
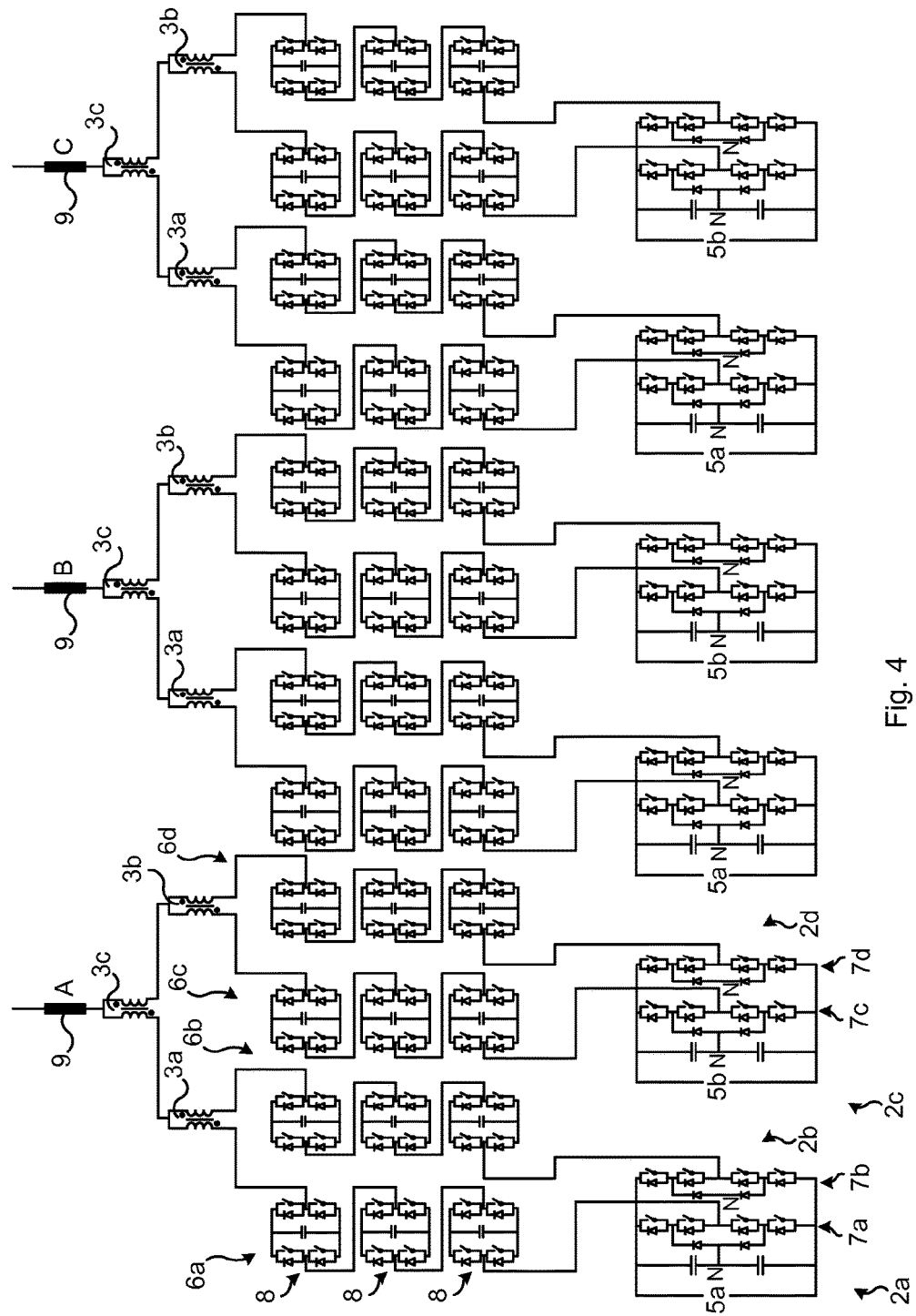
FIG. 4 is a schematic circuit diagram of another three-phase embodiment of a converter arrangement in accordance with the present invention.

Another embodiment of a three-phase converter arrangement 1 of the present invention is schematically illustrated in FIG. 4. In this embodiment, each phase leg comprises four parallel sub-converters 2, i.e. a first sub-converter 2a, a second sub-converter 2b, a third sub-converter 2c and a fourth sub-converter 2d. As also described with reference to the other FIGS. 1-3, each of the sub-converters 2 comprise an chain-link 6 and a common DC link multilevel converter 7, here an NPC inverter leg 7. In order to combine all four parallel sub-converters 2 in the IPT interface 3, a first IPT 3a connects the first and second sub-converters 2a and 2b, a second IPT 3b connects the third and fourth sub-converters 2c and 2d, and a third IPT 3c connects the first and second IPT with the phase line A, B and C, respectively. Thus, by using more than one IPT, at different levels, in the IPT interface 3, any number of sub-converters 2 may be combined, e.g. 2, 4, 8 or 16 sub-converters 2 per phase leg. This type of IPT interface with cascaded IPTs was above referenced to as N-legged IPT. The IPT interface 3 of FIG. 4 may then be called a four-legged IPT. Another optional feature of the present invention which is illustrated in the embodiment of FIG. 4 is the use of a plurality of DC busses 5. If only a single common DC bus is used, the converter arrangement may be vulnerable to any malfunction of the DC bus, while if a plurality of DC busses are used, the converter arrangement 1 may still be at least partially functional by means of the other DC bus(es). In the embodiment of FIG. 4, two DC busses are used, a first DC bus 5a and a second DC bus 5b. The whole bus lines are not shown, but are referenced at each interface with the common DC link multilevel converters 7 of each sub-converter 2. The first DC bus 5a is connected to the first and second sub-converters 2a and 2b of each phase leg, while the second DC bus 5b is connected to the third and fourth sub-converters 2c and 2d of each phase leg. It is conceivable to use even more DC busses 5, to obtain even higher redundancy, e.g. one DC bus 5 per sub-converter 2 of each phase leg, in this case four DC busses, one for each of the sub-converters 2a-d of the converter phase legs in FIG. 4. The DC-busses may still be common DC busses for balancing power between the different phase legs since a first DC bus 5 may connect the first sub-converter 2 of each phase leg and so on.

There are several variants of the topology of the present invention, which could also be considered for e.g. FACTS applications, present and future. It may be possible to utilise any converter topology as the sub-converter 2 building block. Typical series cascade transformer arrangements could also be used to further increase the total output voltage of the converter. Any of these variants would still utilise advantages of the present invention e.g. the use of IPTs 3 to reduce switching losses, and a common DC bus 5 within the converter arrangement 1.

The creation of extra voltage levels with use of IPTs may make it feasible to utilise higher voltage valves/cells. A problem with utilising higher voltage cells in other topologies is that the lower number of voltage levels may result in unacceptable harmonic performance. However, the use of the IPT interface 3 provides double the number of voltage levels and hence a two times increase in the harmonic performance. The invention gives flexibility for the compensation of negative sequence currents. It maintains the cascaded multi-level structure to deal with high voltages and reduces the need to de-rate or dimension the semiconductors for higher voltage or current for zero-sequence injection.

EXAMPLES

Example 1

IPT

The IPT 3 may effectively be a single primary, single secondary transformer, where the two windings are connected in series. The series connection point may be taken as the output and the remaining two terminals as the inputs. The two closely coupled windings may be arranged so that the flux created by equal currents entering the input terminals is cancelled out, leaving in the core the flux created by the voltage difference between the two input terminals. This results in the voltage-ampere (VA) rating of the IPTs being a small fraction of the total VA rating for the converter arrangement 1, and also ensures equal current sharing between the two input poles.

The resultant minimal flux in the IPTs may mean they require a physically small core and relatively large windings. This means however that the modulation strategy should be tailored to control the time integral of voltage difference at the inputs of each IPT. This may limit the maximum flux in the core of each IPT and reduce the resultant cost of the IPTs.

Typically, if converter poles are parallel so that the output of each pole is connected together, then each pole must be switched to create the same output voltage at every instant. The IPTs, however, support any instantaneous voltage difference between the two poles, and the output voltage may then be the average of the voltage at the two inputs.

Example 2

Modulation

There are various modulation methods that may be be utilised in this new converter arrangement 1. Harmonic elimination techniques may be used to mitigate the harmonics occurring at multiples of the fundamental frequency and hence improve the harmonic performance.

Other strategies, such as carrier based techniques and space vector modulation may also/alternatively be employed with the present invention.

Example 3

Fault Tolerance

Utilising a common DC bus 5 for the entire converter arrangement 1 may mean that a fault in one valve/cell 8 renders the whole converter arrangement non-operational. This may not meet FACTS typical reliability requirements. One way to increase the redundancy is to use an IPT interface 3 with a higher number of IPT legs as in FIG. 4. Here, the different sub-converters 2 can be connected to one of two separate common DC busses 5, meaning that the loss of one DC bus does not eliminate all mechanisms for energy exchange between phases of the converter arrangement 1.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A converter arrangement for an AC system, the converter arrangement comprising at least one phase leg comprising:

a first sub-converter;

a second sub-converter;

a third sub-converter;
a fourth sub-converter;
an inter-phase transformer (IPT) interface configured for connecting the first, second, third and fourth sub-converters with a phase line of the AC system, wherein the IPT interface comprises a first IPT connecting the first and second sub-converters, a second IPT connecting the third and fourth sub-converters, and a third IPT configured for connecting the first and second IPTs with the phase line; and
at least one DC bus connected to the first and second sub-converters that are connected to the first IPT, but not connected to the third and fourth sub-converters that are connected to the second IPT;
at least another DC bus connected to the third and fourth sub-converters that are connected to the second IPT, but not connected to the first and second sub-converters that are connected to the first IPT;
wherein the first, second, third and fourth sub-converters are connected in parallel between the IPT interface and one of the at least one DC bus and the at least another DC bus, and wherein each of the first, second, third and fourth sub-converters comprises:
a chain-link converter connected to the IPT interface and comprising a plurality of converter cells connected in series with each other; and
a common DC link multilevel converter connected to the one of the at least one DC bus and the at least another DC bus and in series with the chain-link converter.

2. The converter arrangement of claim 1, wherein the common DC link multilevel converter is a neutral point clamp (NPC) inverter, or a flying-capacitor inverter.

3. The converter arrangement of claim 2, wherein the NPC inverter is an active NPC inverter.

4. The converter arrangement of claim 2, wherein each of the converter cells is a full-bridge cell.

5. The converter arrangement of claim 2, wherein the AC system is a three-phase system and wherein the at least one phase leg comprises three phase legs.

6. The converter arrangement of claim 2, wherein
the at least one DC bus is connected to the common DC link multilevel converter of the first sub-converter and the common DC link multilevel converter of the second sub-converter, but not connected to the common DC link multilevel converter of the third sub-converter and the common DC link multilevel converter of the fourth sub-converter, and
the at least another DC bus is connected to the common DC link multilevel converter of the third sub-converter and the common DC link multilevel converter of the fourth sub-converter, but not connected to the common DC link multilevel converter of the first sub-converter and the common DC link multilevel converter of the second sub-converter.

7. The converter arrangement of claim 2, wherein the at least one DC bus is connected to an energy storage, comprising a capacitor, battery or supercapacitor.

8. The converter arrangement of claim 1, wherein each of the converter cells is a full-bridge cell.

9. The converter arrangement of claim 8, wherein the AC system is a three-phase system and wherein the at least one phase leg comprises three phase legs.

10. The converter arrangement of claim 8, wherein
the at least one DC bus is connected to the common DC link multilevel converter of the first sub-converter and the common DC link multilevel converter of the second sub-converter, but not connected to the common DC link multilevel converter of the third sub-converter and the common DC link multilevel converter of the fourth sub-converter, and
the at least another DC bus is connected to the common DC link multilevel converter of the third sub-converter and the common DC link multilevel converter of the fourth sub-converter, but not connected to the common DC link multilevel converter of the first sub-converter and the common DC link multilevel converter of the second sub-converter.

11. The converter arrangement of claim 8, wherein the at least one DC bus is connected to an energy storage, comprising a capacitor, battery or supercapacitor.

12. The converter arrangement of claim 1, wherein the AC system is a three-phase system and wherein the at least one phase leg comprises three phase legs.

13. The converter arrangement of claim 12, wherein the AC system is a flexible alternating current transmission system (FACTS) or a motor drive.

14. The converter arrangement of claim 13, wherein
the at least one DC bus is connected to the common DC link multilevel converter of the first sub-converter and the common DC link multilevel converter of the second sub-converter, but not connected to the common DC link multilevel converter of the third sub-converter and the common DC link multilevel converter of the fourth sub-converter, and
the at least another DC bus is connected to the common DC link multilevel converter of the third sub-converter and the common DC link multilevel converter of the fourth sub-converter, but not connected to the common DC link multilevel converter of the first sub-converter and the common DC link multilevel converter of the second sub-converter.

15. The converter arrangement of claim 13, wherein the at least one DC bus is connected to an energy storage, comprising a capacitor, battery or supercapacitor.

16. The converter arrangement of claim 12, wherein
the at least one DC bus is connected to the common DC link multilevel converter of the first sub-converter and the common DC link multilevel converter of the second sub-converter, but not connected to the common DC link multilevel converter of the third sub-converter and the common DC link multilevel converter of the fourth sub-converter, and
the at least another DC bus is connected to the common DC link multilevel converter of the third sub-converter and the common DC link multilevel converter of the fourth sub-converter, but not connected to the common DC link multilevel converter of the first sub-converter and the common DC link multilevel converter of the second sub-converter.

17. The converter arrangement of claim 12, wherein the at least one DC bus is connected to an energy storage, comprising a capacitor, battery or supercapacitor.

18. The converter arrangement of claim 1, wherein
the at least one DC bus is connected to the common DC link multilevel converter of the first sub-converter and the common DC link multilevel converter of the second sub-converter, but not connected to the common DC link multilevel converter of the third sub-converter and the common DC link multilevel converter of the fourth sub-converter, and
the at least another DC bus is connected to the common DC link multilevel converter of the third sub-converter and the common DC link multilevel converter of the fourth sub-converter, but not connected to the common DC link multilevel converter of the first sub-converter and the common DC link multilevel converter of the second sub-converter.

19. The converter arrangement of claim 18, wherein the at least one DC bus is connected to an energy storage, comprising a capacitor, battery or supercapacitor.

20. The converter arrangement of claim 1, wherein the at least one DC bus is connected to an energy storage, comprising a capacitor, battery or supercapacitor.

* * * * *